United States Patent
O'Hare

[15] 3,707,045
[45] Dec. 26, 1972

[54] TEACHING DEVICE

[72] Inventor: Patrick H. O'Hare, 80 Carrol Street, Pentwater, Mich. 49449

[22] Filed: March 3, 1970

[21] Appl. No.: 16,142

[52] U.S. Cl. ................................................35/74
[51] Int. Cl. ..............................................G09b 1/22
[58] Field of Search........35/35 F, 74, 22 R, 31 A, 36; 273/155

[56] References Cited

UNITED STATES PATENTS

| 193,099 | 7/1877 | Shepherd | 35/36 X |
| 462,405 | 11/1891 | Hallett | 35/74 |
| 1,346,929 | 7/1920 | Zion | 35/74 |
| 1,346,930 | 7/1920 | Zion | 35/74 |
| 1,527,126 | 2/1925 | Dodd | 35/22 R |
| 1,829,295 | 10/1931 | Phagans | 35/74 |
| 1,833,793 | 11/1931 | Pfleger | 35/74 |
| 2,810,211 | 10/1957 | Zesbaugh | 35/74 X |
| 2,952,923 | 9/1960 | Calabrese | 35/36 |
| 3,209,476 | 10/1965 | Wachtel | 40/70 |

*Primary Examiner*—Harland S. Skogquist
*Attorney*—Price, Heneveld, Huizenga & Cooper

[57] ABSTRACT

A teaching device having sets of conceptually related forms on a plurality of cards or wheels mounted behind a screen so that only one form from each card or wheel is visible at a given time and so that the cards or wheels are movable with respect to the screen. The rear sides of the cards or wheels have sets of colored edges or similar coded forms which are positioned behind a second screen with openings for one colored area from each card. The sets of colored areas are so related to the conceptually related forms that when one set of like colors is seen at the second screen, one set of conceptually related forms will be seen at the first screen.

1 Claim, 3 Drawing Figures

PATENTED DEC 26 1972  3,707,045

INVENTOR.
PATRICK H. O'HARE

BY
Price, Heneveld
Huizenga & Cooper

ATTORNEYS

TEACHING DEVICE

This invention relates to teaching devices. In one of its aspects it relates to a teaching device having sets of conceptually related forms on a plurality of cards movably mounted behind a first screen which has a plurality of holes or windows to permit one form on each card to be seen therethrough, there being means on each card mounted behind a second screen with holes or windows to permit visual checking on the second screen of proper selection of conceptually related forms appearing on the first screen.

It is generally accepted that the order of importance in the language process is listening, speaking, reading and writing. The fundamental base of language development is the ability of a child to use and understand the spoken language which he hears in his environment. When a child has not learned to recognize basic language sounds and to relate them to concepts, his reading ability is greatly hindered. As a result, he often becomes discouraged at an early age and develops a lack of self-confidence. This hinders his language development. Occasionally children must work at their own speed and develop self-confidence as they progress in order to reach their level of competence. Unfortunately, the financial and human resources available for education do not permit the kind of individual assistance required to develop each child at his own speed. It is evident that inexpensive and adequate teaching aids are required to assist children in their language development.

Educational teaching devices are well-known. Many devices have been developed as learning aids. Heretofore the teaching aids have been in the nature of question-answer devices where a card has a question and the answer is printed on the opposite side. For example, U.S. Pat. No. 2,924,025 discloses an educational device having a front and back cover with a movable element inside the cover. A question is shown on one side and the answer is shown on the other side. These devices do not illustrate the relationship between various words or other conceptual ideas, and cannot be used for effectively teaching language.

U.S. Pat. No. 2,519,922, Newbury, discloses a device in which a picture on a windowed page is completed by rotating a plurality of discs mounted behind the page until the proper portion of the picture is behind each window on the page. The back side of the disc can be provided with portions of another picture which will complete a pictorial representation on the back of another windowed page when the front page picture is complete. These devices do not teach basic interrelationship between sounds and concepts through a selection of related forms and means for checking the validity of the selection so made.

By various aspects of this invention one or more of the following, or other, objects can be obtained.

It is an object of this invention to provide an educational teaching device which aids in the development of one's ability to recognize conceptually related forms.

It is a further object of this invention to provide an educational teaching device which permits one to select conceptually related forms and to check the validity of the selection so made.

It is yet another object of this invention to provide an inexpensive educational teaching device for teaching conceptual relationships between forms, wherein different sets of teaching forms are interchangeable.

It is a further object of this invention to provide a simple and inexpensive educational device for teaching relationship between sounds.

It is yet another object of this invention to provide a simple and inexpensive device for teaching the relationship between letters.

It is yet another object of this invention to provide a simple and inexpensive educational device for teaching the relationship between perceptually related forms.

It is still another object of this invention to provide a simple and inexpensive educational device for teaching mathematical relationships.

It is yet another object of this invention to provide a simple and inexpensive educational device to develop one's ability to recognize logically related portions of a story.

It is yet another object of this invention to provide an educational teaching device for the promotion of auditory and visual consonant recognition.

It is yet another object of this invention to provide an educational teaching device to promote phonic capabilities.

It is still another object of this invention to provide an educational teaching device to improve articulation skills.

It is another object of this invention to provide an educational teaching device to promote vocabulary growth.

Other aspects, objects, and the several advantages of this invention are apparent to one skilled in the art from a study of this disclosure, the drawings, and the appended claims.

According to the invention there is provided a teaching device comprising a plurality of cards mounted behind first and second screens such that portions of each card are visible through windows of both of the screens. Means mount each of the cards for movement with respect to the windows in the screens. A plurality of different sets of conceptually related and different forms are on the cards, one of the related forms in a given set being on each of the cards. Each of the forms are aligned with the windows behind the first screen such that one of the forms on each card can be visible at the first screen. Means are provided on the cards in alignment for visual registry with the windows of the second screen to indicate an alignment of conceptually related forms in visual registry with the first screen windows. In this manner, selection of conceptually related forms can be made by manipulation of the cards and observing the forms on the cards in visual registry with the first screen windows, and the validity of the relationship between the forms thus selected can be checked by visual inspection of the second screen.

The conceptually related forms can be pictures which represent sounds, each set having a similarly related sound. The forms can also comprise words which are related through initial, medial, or terminal sounds. Alternately, the conceptually related forms can be numbers which comprise mathematical tables. Additionally, the conceptually related forms in a given set can comprise a sequence of logically related scenes in a story pattern. Still further, the conceptually related forms can be geometric in shape to develop one's perceptive ability.

The invention will now be described with reference to the accompanying drawings in which.

Figure 2:
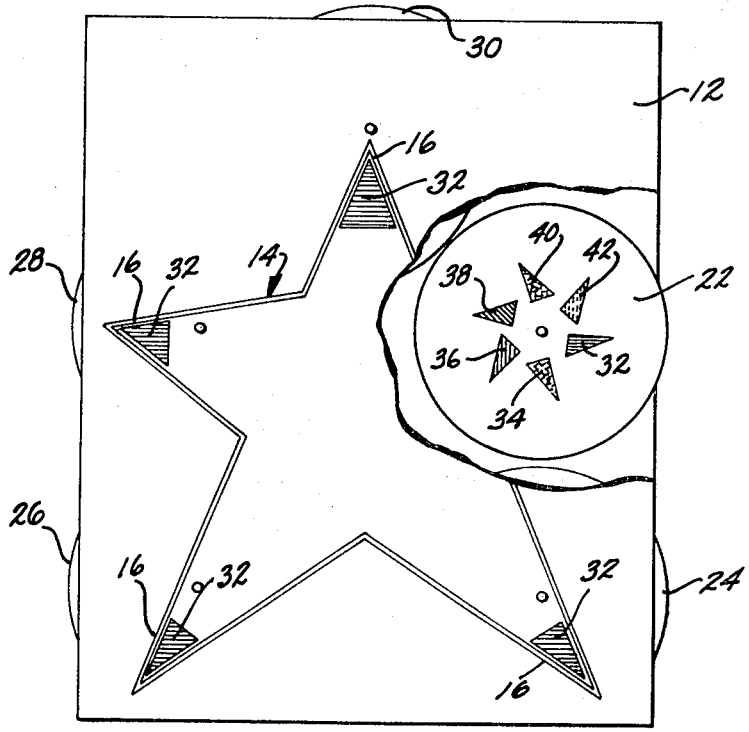
FIG. 2 is a plan view of the opposite side of the educational device according to the invention.

Referring now to the drawings, there is shown an educational device having a front cover 18 with a plurality of holes or windows 20 spaced about the sheet. A back cover 12 is affixed to the front cover at bottom portions, leaving the interior between the front cover 18 and the back cover 12 free. A star configuration 14 having a plurality of holes or windows 16 at the tips of the star is formed on the back cover 12.

A plurality of discs 22, 24, 26, 28 and 30 are mounted between the covers 12 and 18 and are movable with respect thereto so that different portions of the discs are visible through the holes or windows in the front and back cover, when each of the discs is moved with respect to the covers.

Figure 1:
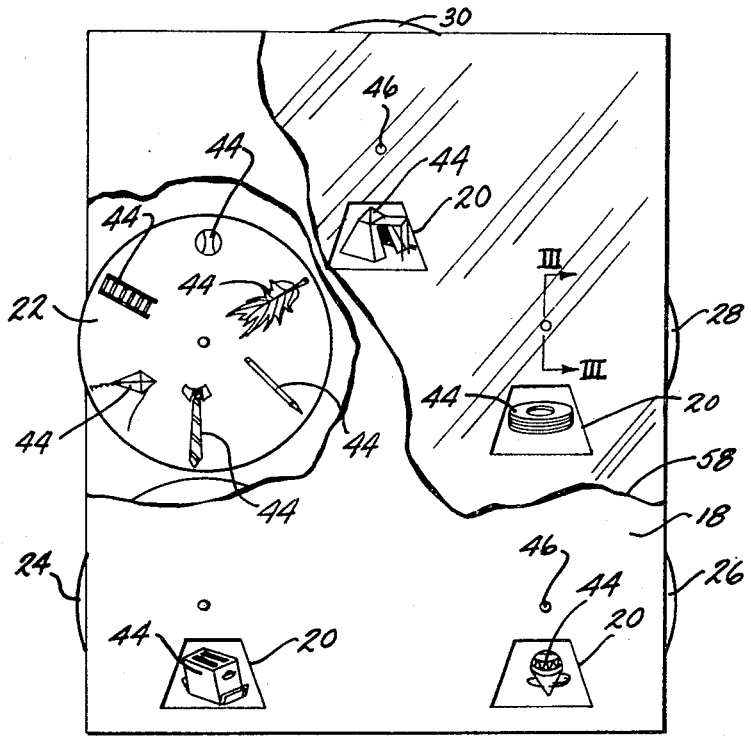
FIG. 1 is a plan view of a front side of the educational device according to the invention.

Colored spots 32, 34, 36, 38, 40 and 42 are spaced about the back of each of the discs in alignment for registry with the holes or windows 16 in the back cover 12. Each of the spots 32, 34, 36, 38, 40 and 42 represents a different color. As seen in FIGS. 1 and 2, the discs 22, 24, 26, 28 and 30 each extend out from one side of the covers 12 and 18 to permit grasping of a portion of the disc to rotate the disc about a central pivot with respect to the covers 12 and 18.

On the front face of each disc, 22, 24, 26, 28 and 30, are six sets of conceptually related forms 44. Each form comprises a pictorial representation aligned for registry with the windows 20 on the front cover 18. One conceptually related form for each set is positioned on each of the discs. The colored spots 32, 34, 36, 38, 40 and 42 on the back face of the discs are so related to the pictorial representations 44 on the front face of the discs that when one set of conceptually related forms appears at the windows or holes 20 on the front cover 18, the same color will appear at the holes or windows 16 at the tips of the star configuration.

For example, each of the discs illustrated in FIG. 1 is positioned to show one set of conceptually related forms at the windows 20. For example, disc 30 shows at its window a tent. Disc 28 shows at its window a tire. Disc 26 shows at its window a top. Disc 24 shows at its window a toaster. If the front cover were not broken away, disc 22 would show at its window a tie. Each of these forms is related conceptually through the letter *t* as the first letter in the word which is represented by each picture. In addition, the initial sound of each word is the same. At the back cover 12, the identical color 32 is seen at each tip of the star configuration 14.

Figure 3:
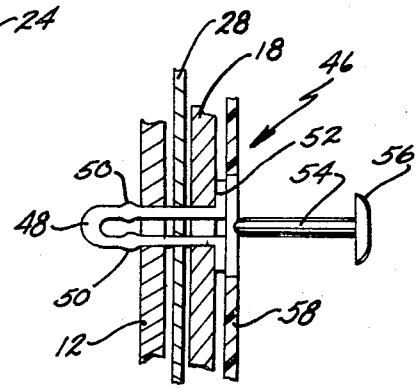
FIG. 3 is a sectional view through lines III—III of FIG. 1.

Each of the discs if pivotably mounted between the front cover 18 and the back cover 12 in a manner illustrated in FIG. 3. With reference specifically to FIG. 3, the front cover 18 and back cover 12 have small holes therethrough in registry with each other. A pivot assembly 46 extends through the holes in the front and back covers and through a central hole in disc 28. The pivot assembly comprises a U-shaped member 48 having protuberances 50 at an inner end and having flanges 52 at an outer end. A pin 54 having a head 56 extends between the U-shaped member and forces the protuberances outwardly when the pin is within the U-shaped member. When the pin and U-shaped member are assembled, the front cover 18 and back cover 12 are held in fixed relationship while the disc 28 is free to rotate about the pivot assembly 46. By this construction, the discs can be replaced by other sets of discs having different sets of conceptually related forms. This can be done by removing pins 56 and then removing the U-shaped member 48. The discs can then be removed from between the covers and new discs inserted in their place. The reverse procedure is followed to secure the discs in position between covers 12 and 18.

The invention provides a means for teaching recognition of conceptually related forms, and for checking the accuracy of selections so made. The invention can be used for teaching the relationship between various sounds by using drawings which represent articles having particular sounds. The pictorial representations can be related through the first letter of a word or by rhyming syllables. For example, the pictorial forms can be related through a same sound for a first syllable of a word represented by the pictures. The medial and terminal syllables in the word can also be used in the same manner. The accuracy of each selection can be checked easily by reference to the back of the device wherein the same colors indicate a proper selection.

The various discs can represent varying degrees of difficulty in selecting different conceptually related forms. For example, disc 30 can represent the reference wheel. The form seen through the window 20 will be compared to the remainder of the forms seen through the windows on the front cover 18. Wheels 28, 26, 24 and 22 can represent varying degrees of difficulty in comparing the reference forms to the other form of each disc. Thus, as one is able to successfully relate the forms of the disc progressively clockwise from the top, he gains proficiency in the particular type of relationship of the set of forms.

Instead of pictures, letters and words can be used and relationship between the words can be taught. For example, the front cover 18 can be provided with a transparent plastic cover 58 upon which letters or forms can be traced. For example, if a letter appears at the window 20, the letter can be traced with a crayon onto the plastic sheet 58. The disc 28, for example, can then be rotated beneath the window at which the tracing is made and other letters will then appear through the disc. Comparisons can thereby be made between the shapes of different letters.

As another alternative, geometric forms can be substituted for the pictures for teaching perceptual concepts. As a still further variant of the invention, each set of related forms can comprise a sequence of steps in a story.

The invention can also be used for teaching mathematical relationships. For example, disc 30 can contain numbers on its front face for registry with window 20. Each of the other discs 28, 26, 24 and 22 can have numbers on them which represent multiples of the numbers on disc 30. For example, disc 28 can have numbers representing two times each number represented on disc 30. For example, if number two appeared at window 20 for disc 30, wheel 28 would be rotated until the number four from disc 28 showed at its respective window. On the back cover 12, the same color would show at the windows for the discs 30 and 28. Disc 26 could represent multiples of three of the numbers on disc 30, etc.

The use of related colored areas on the back of the device in checking the accuracy of the selections made on the front of the device is quite important in the learning process. The student must gain self-confidence in the learning process. The ability to ascertan the validity of one's selection on an individual basis builds self-confidence. In addition, the system permits the student to work at his own speed.

Whereas the invention has been described with relation to related colors on the back of the discs, the broader aspects of the invention contemplate the use of means other than color on the back of the discs. For example, sets of identical geometric forms, sets of numbers, or sets of simple pictures can be substituted for the sets of colors. Other means for checking the accuracy of selections will be suggested to those skilled in the art.

The invention can also be used for teaching modern math relationships. For example, disc 30 can contain pictorial or graphic representations on its front face for registry with window 20. Each of the other discs 28, 26, 24 and 22 can have listings of the elements, number qualities, and other symbolic language that relate to the representations on disc 30 and in turn to each other. For example, disc 28 can have a listing of the elements of a pictorial representation of a modern math set represented on disc 30. If a math set A representation containing five members appeared at window 20 on disc 30, disc 28 would be rotated until the words therein state the number of that set. On the back cover 12, the same color would show at the windows for the discs 30 and 28. Disc 26 could contain mathematical symbols directly relating to discs 30 and 28, etc.

Reasonable variation and modification are possible within the scope of the foregoing disclosure, the drawings, and the appended claims without departing from the spirit of the invention.

The embodiments of the invention in which an exclusive property or privilege is claimed are defined as follows.

1. A teaching device comprising:
a first and second screen having spaced window openings therein, said spaced window openings in said second screen being triangular in shape and positioned in the relationship of the points of a star;
a plurality of cards pivotally mounted behind said first and second screens, said cards having portions which extend out from the edges of said screen to permit rotational movement of said cards with respect to said openings in said first and second screens, and having other portions of each card visible through said windows of both of said first and second screens;
means pivotally mounting each of said cards for rotational movement with respect to said windows in said first and second screens;
a plurality of different sets of conceptually related and different forms on said cards, one of said related forms in a given set being on each of said cards; each of said forms being aligned with said windows behind said first screen such that one of said forms on each card can be visible at said first screen;
color coated means on said cards aligned for visual registry with said windows of said second screen to indicate an alignment of conceptually related forms in visual registry with said first screen windows, such that selection of conceptually related forms can be made by manipulation of said cards in observing said forms on said cards in visual registry with said first screen windows, and the validity of the relationship between the forms so selected can be visually checked by verifying that the same color appears in each of said triangular window openings in said second screen positioned in the relationship of the points of a star.

* * * * *